United States Patent
Endo et al.

(10) Patent No.: US 7,704,431 B2
(45) Date of Patent: Apr. 27, 2010

(54) MOLD FOR GOLF BALL

(75) Inventors: Seiichiro Endo, Kobe (JP); Masatoshi Yokota, Kobe (JP); Yoshiyuki Nakai, Kobe (JP); Hiroaki Tanaka, Kobe (JP)

(73) Assignee: SRI Sports Limited, Kobe (JP)

( * ) Notice: Subject to any disclaimer, the term of this patent is extended or adjusted under 35 U.S.C. 154(b) by 1522 days.

(21) Appl. No.: 10/945,993

(22) Filed: Sep. 22, 2004

(65) Prior Publication Data

US 2005/0098921 A1    May 12, 2005

(30) Foreign Application Priority Data

Nov. 12, 2003   (JP) ............................. 2003-381921

(51) Int. Cl.
  *B29C 45/14*   (2006.01)
(52) U.S. Cl. ..................... 264/275; 264/278; 264/279; 264/279.1; 425/116
(58) Field of Classification Search ............... 264/278; 425/116
  See application file for complete search history.

(56) References Cited

U.S. PATENT DOCUMENTS 6,250,903 B1 *   6/2001   Fernandez et al. .......... 425/130

2002/0079615 A1 *   6/2002   Puniello et al. ............. 264/278
2003/0153410 A1   8/2003   Shimosaka

FOREIGN PATENT DOCUMENTS

| JP | 7-80848 A | 3/1995 |
| JP | 2000-37480 A | 2/2000 |
| JP | 2003-190332 A | 7/2003 |
| JP | 2003-266440 A | 9/2003 |

* cited by examiner

*Primary Examiner*—Monica A Huson
(74) *Attorney, Agent, or Firm*—Birch, Stewart, Kolasch & Birch, LLP

(57) ABSTRACT

A mold comprises a spherical cavity, a support pin capable of being moved forward and backward with respect to the cavity, and a vent pin (8). The vent pin (8) includes two slits (S), an annular groove (20) and a vertical groove (22). An upper end (24) of the slit (S) is opened toward the cavity. A lower end (26) of the slit (S) is opened toward the annular groove (20). The annular groove (20) is coupled to the vertical groove (22). The lower end of the vertical groove (22) is opened toward air. A width (W) of the slit (S) is preferably equal to or greater than 1 μm, is more preferably equal to or greater than 3 μm, and is particularly preferably equal to or greater than 5 μm. A depth (D) of the slit (S) is preferably equal to or greater than 10% of a diameter (φ), is more preferably equal to or greater than 15% of the diameter (φ), and is particularly preferably equal to or greater than 20% of the diameter (φ). It is preferable that the same slit (3) should be formed on the support pin.

8 Claims, 9 Drawing Sheets

(a)

(b)

(a)

(b)

MOLD FOR GOLF BALL

This application claims priority on Patent Application No. 2003-381921 filed in JAPAN on Nov. 12, 2003.

BACKGROUND OF THE INVENTION

1. Field of the Invention

The present invention relates to a mold for a golf ball and a method of manufacturing a golf ball. More particularly, the present invention relates to an improvement in a mold to be used for forming the cover of a golf ball.

2. Description of the Related Art

A two pieces golf ball is constituted by a core and a cover covering the surface of the core. In the manufacture of the two pieces golf ball, a mold comprising a spherical cavity is used. The mold comprises a support pin capable of being moved forward and backward with respect to the cavity and a vent pin for causing the cavity and outside air to communicate with each other. By the support pin which is moved forward, the core is held on the center of the cavity. Then, a resin composition is put in an injection molding machine and is thus molten, and is injected toward the cavity. The molten resin composition fills a gap between a cavity surface and the core. The molten resin composition covers the core and coagulates to form a cover shortly.

In a stage in which the core is held by the support pin, air is present in the gap between the cavity surface and the core. When the molten resin composition flows into the cavity, the air in the cavity is discharged to an outside. The discharge is carried out through a clearance of the support pin and a clearance of the vent pin.

In some cases, the molten resin composition flows into the clearance to form a fin. The fin is formed along the outer peripheral surface of the support pin or the vent pin. Therefore, the fin is almost ring-shaped. In respect of the appearance of the golf ball, it is necessary to remove the fin. Usually, the fin is removed by grinding. The surface of the golf ball is wholly or partially subjected to the grinding process so that the fin is removed.

In some cases, a large fin cannot be removed by the grinding. The remaining fin considerably deteriorates the appearance of the golf ball. In order to reliably remove the large fin, it is necessary to prolong a time required for the grinding. The grinding for a long time deteriorates the productivity of the golf ball. In addition, if the degree of the grinding is high, precision in the dimension of a dimple formed on the surface of the golf ball is reduced. The reduction in the precision in the dimension adversely affects the aerodynamic characteristics of the golf ball.

If the clearance is reduced, the generation of a large fin can be suppressed. In a mold having a small clearance, however, air is insufficiently discharged in some cases. The insufficient discharge causes defects such as a bare (a space formed by the residual air), the invasion of the air into a cover, scorching (burning caused over the cover) and a weld mark (a linear mark generated in a place in which the resin compositions are bonded to each other). Usually, the resin composition is injected from the equator of a cavity. Therefore, the defects concentrate in the vicinity of a pole in the cavity. In particular, the air is apt to remain just above the pin.

In the case in which the flow speed of the molten resin composition is high, the air is apt to be insufficiently discharged. In recent years, a golf ball comprising a cover having a small thickness has been developed and put on the market. In the cover molding of the golf ball, it is necessary to inject the molten resin composition at a high speed. Consequently, there is a problem in that the discharge of the air is defective.

Japanese Laid-Open Patent Publication No. 2000-37480 has disclosed a technique for forming a support pin by a porous material to enhance the discharging property of air. The support pin causes a hole to be clogged due to repetitive use. The support pin is expensive. In addition, the support pin is fragile and is broken easily. The support pin formed by the porous material is not practical.

Japanese Laid-Open Patent Publication No. 7-80848 and US No. 2003-153410 have disclosed a mold for a golf ball which comprises a slit for discharging air. The structure of the mold is complicated. In the mold, the slit restricts the design of a dimple pattern. The slit is less effective for reducing defects in the vicinity of the pole. The slit is not effective for discharging the air just above a pin. The size of a fin formed by the slit is large. For this reason, the fin damages the appearance of the golf ball.

In a mold attaching importance to the suppression of the fin, the difficulty of the air discharge is generated. On the other hand, in a mold having a clearance increased in order to smoothly discharge the air, a large fin is apt to be generated. The large fin is hard to remove and remains easily. Both the difficulty of the air discharge and the remaining fin deteriorate the quality of a golf ball. It is an object of the present invention to provide a golf ball of high quality.

SUMMARY OF THE INVENTION

A mold for a golf ball according to the present invention comprises a spherical cavity and a support pin capable of being forward and backward with respect to the cavity. The support pin includes a slit having an upper end opened toward the cavity and having a width of 1 µm to 30 µm. The mold has such a structure that a circumference of a core held on a center of the cavity by means of the support pin is filled with a molten polymer composition to form a cover constituted by the polymer composition. It is preferable that the support pin should include at least two slits. Each of the slits has a depth of 0.3 mm to 3.8 mm.

Another mold for a golf ball according to the present invention comprises a spherical cavity, a support pin capable of being moved forward and backward with respect to the cavity, and a vent pin. The vent pin includes a slit having an upper end opened toward the cavity and having a width of 1 µm to 30 µm. The mold has such a structure that a circumference of a core held on a center of the cavity by means of the support pin is filled with a molten polymer composition to form a cover constituted by the polymer composition. It is preferable that the vent pin should include at least two slits. Each of the slits has a depth of 0.3 mm to 3.8 mm.

A golf ball manufacturing method according to the present invention comprises the steps of:

holding a core on a center of a spherical cavity by means of a support pin which can be moved forward and backward with respect to the cavity, and includes a slit having an upper end opened toward the cavity and having a width of 1 µm to 30 µm; and filling a circumference of the core with a molten polymer composition while discharging air in the cavity through a slit.

Another golf ball manufacturing method according to the present invention comprises the steps of:

preparing a mold comprising a support pin capable of being moved forward and backward with respect to a spherical cavity and a vent pin, the vent pin including a slit having an upper end opened toward the cavity and having a width of 1 µm to 30 µm;

holding a core on a center of the cavity of the mold by means of the support pin; and filling a circumference of the core with a molten polymer composition while discharging air in the cavity through the slit.

In the mold according to the present invention, the air is discharged from the slit. Therefore, a defect is generated with difficulty. The size of the fin formed by the slit is small. Therefore, the fin does not damage the appearance of the golf ball.

DESCRIPTION OF THE PREFERRED EMBODIMENTS

Preferred embodiments of the present invention will be described below in detail with reference to the drawings.

Figure 1:
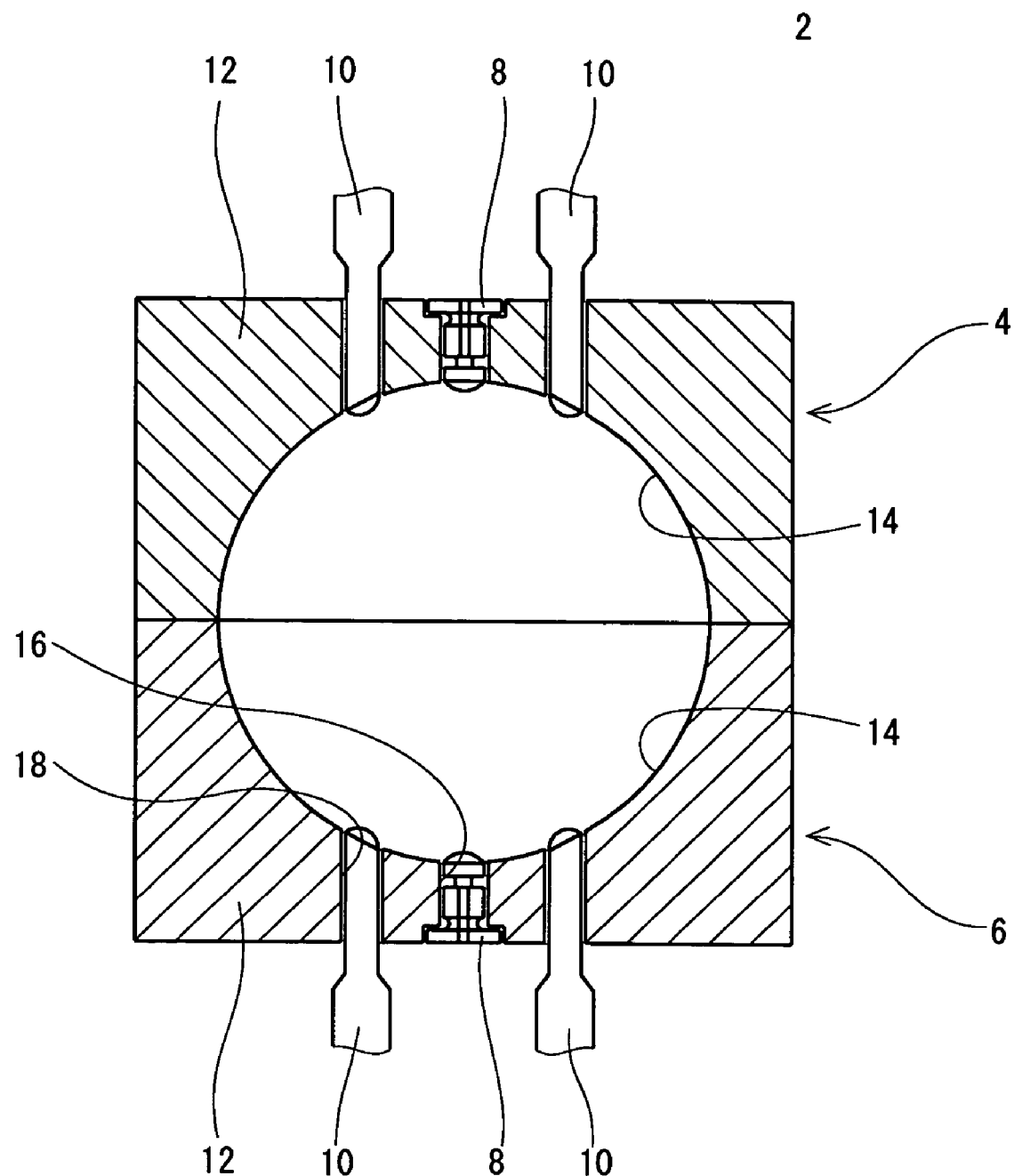
FIG. 1 is a sectional view showing a part of a mold for a golf ball according to an embodiment of the present invention.

A mold 2 shown in FIG. 1 comprises an upper mold half 4, a lower mold half 6, two vent pins 8 and a plurality of support pins 10. The vent pin 8 is positioned in the pole of the upper mold half 4 and that of the lower mold half 6. The support pins 10 are positioned at equal distances from the poles in each of the upper mold half 4 and the lower mold half 6. The number of the support pins 10 in each of the upper mold half 4 and the lower mold half 6 is usually three to eight. In FIG. 1, two support pins 10 are shown in each of the upper mold half 4 and the lower mold half 6. In place of the vent pin 8 positioned in the pole or together with the vent pin 8 positioned in the pole, it is also possible to provide a vent pin positioned in places other than the pole.

Each of the upper mold half 4 and the lower mold half 6 includes a body 12, a cavity surface 14, a vent pin hole 16 and a support pin hole 18. The cavity surface 14 is semispherical. When the mold 2 is tightened, a spherical cavity is formed by the cavity surface 14 of the upper mold half 4 and that of the lower mold half 6 as shown in FIG. 1. The vent pin hole 16 and the support pin hole 18 penetrate through the body 12 from an outside toward the spherical cavity. The inner peripheral surfaces of the vent pin hole 16 and the support pin hole 18 have circular sectional shapes. The vent pin 8 penetrates through the vent pin hole 16. A clearance between the vent pin 8 and the vent pin hole 16 is 5 μm to 100 μm. The support pin 10 penetrates through the support pin hole 18. A clearance between the support pin 10 and the support pin hole 18 is 5 μm to 100 μm. A large number of projections are formed on the cavity surface 14, which is not shown. In the molding of a cover, a dimple having a shape obtained by inverting the shape of the projection is formed by the projection.

Figure 2:
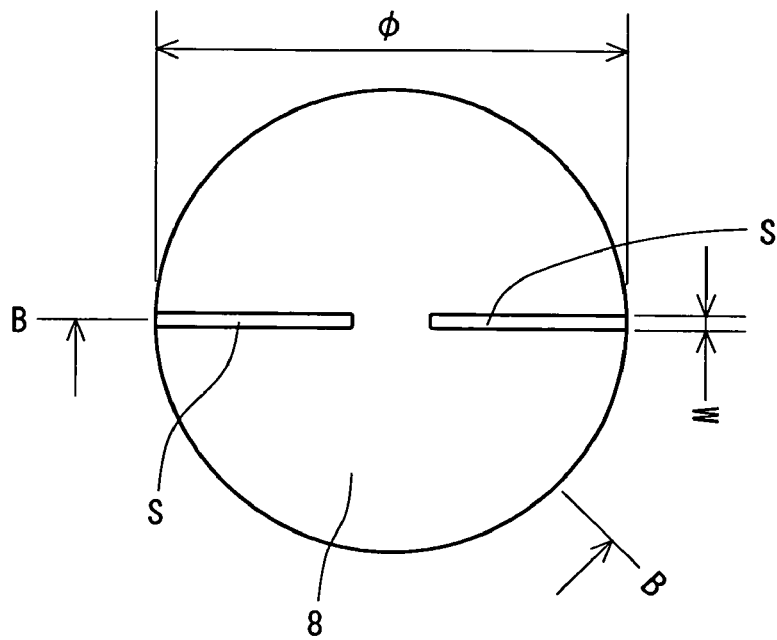
FIG. 2(a) is an enlarged plan view showing a vent pin in the mold of FIG. 1.
FIG. 2(b) is a sectional view taken along a B-B line in FIG. 2(a)
Figure 2:
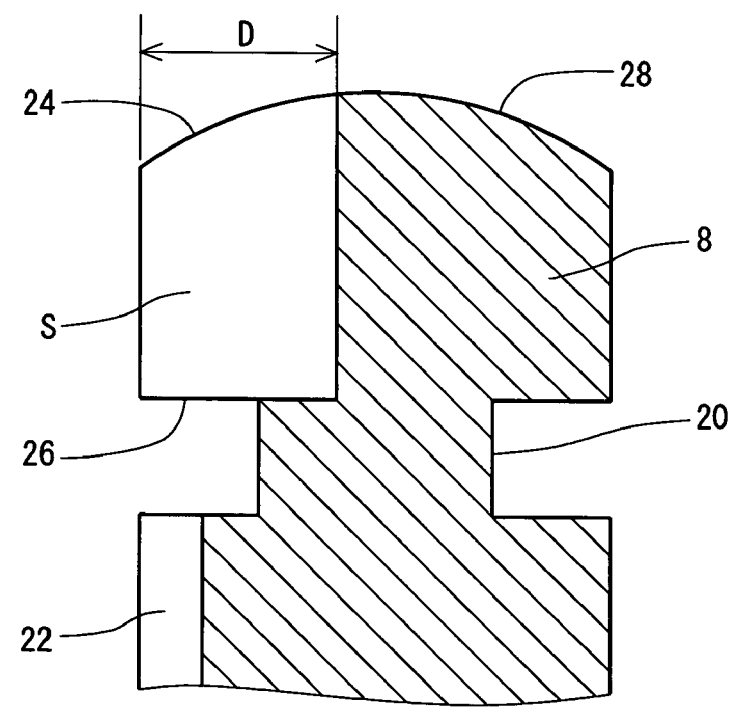

FIG. 2(a) is an enlarged plan view showing the vent pin 8 in the mold 2 of FIG. 1, and FIG. 2(b) is a sectional view taken along a B-B line in FIG. 2(a). The vent pin 8 has a circular cross section. The vent pin 8 has two slits S, an annular groove 20 and a vertical groove 22. An upper end 24 of the slit S is opened toward the cavity. A lower end 26 of the slit S is opened toward the annular groove 20. The annular groove 20 is coupled to the vertical groove 22. The lower end of the vertical groove 22 is opened toward air (see FIG. 1). In other words, the cavity communicates with the outside air through the slit S and the grooves 20 and 22. The lower end 26 of the slit S may be directly opened toward the air without the grooves 20 and 22. A tip portion 28 of the vent pin 8 is curved to be protruded upward in FIG. 2. A dimple is also formed by the tip portion 28. The vent pin 8 has a diameter φ of 1.0 mm to 10.0 mm. In case of a vent pin having a non-circular cross section, the diameter of a circle having an equal area to that of the cross section is set to be the diameter φ of the vent pin.

Figure 3:
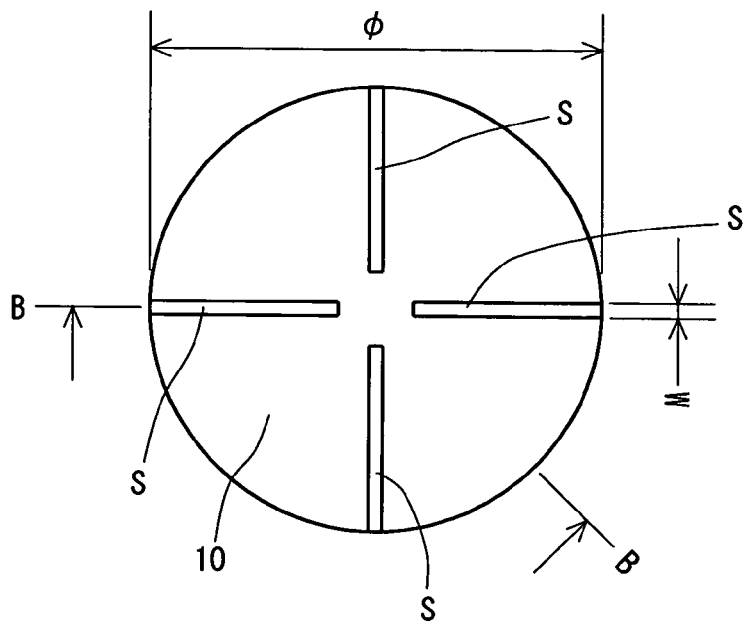
FIG. 3(a) is an enlarged plan view showing a support pin in the mold of FIG. 1.
FIG. 3(b) is a sectional view taken along a B-B line in FIG. 3(a)
Figure 3:
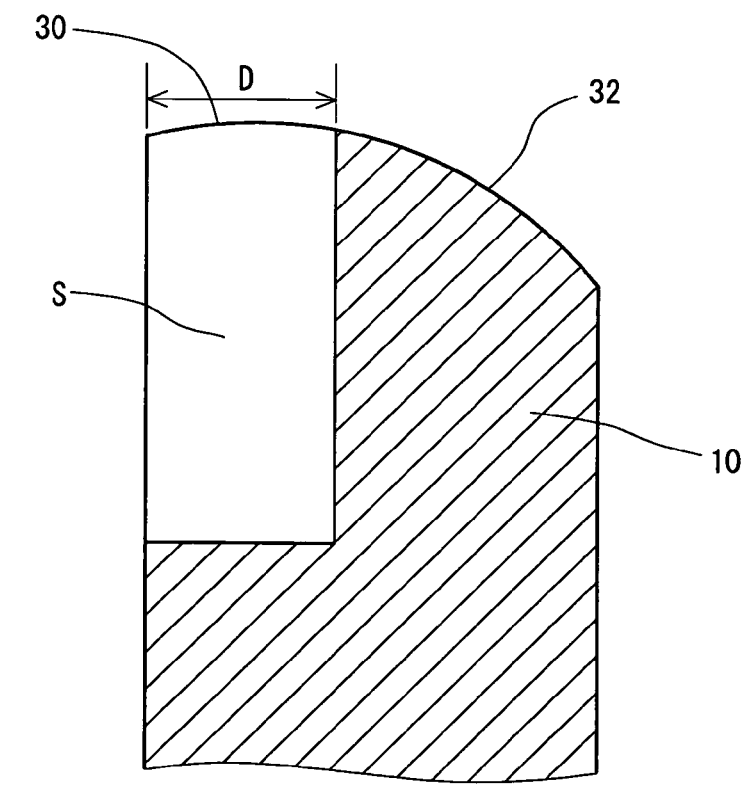

FIG. 3(a) is an enlarged plan view showing the support pin 10 in the mold 2 of FIG. 1, and FIG. 3(b) is a sectional view taken along a B-B line in FIG. 3(a). The support pin 10 has four slits S. An upper end 30 of the slit S is opened toward the cavity. A lower end of the slit S is opened toward the air, which is not shown. In other words, the cavity communicates with the outside air through the slit S. The communication may be achieved through the slit S and the groove. A tip portion 32 of the support pin 10 is curved to be protruded upward in FIG. 3. A dimple is also formed by the tip portion 32. The support pin 10 has a diameter φ of 1.0 mm to 10.0 mm. In case of a support pin having a non-circular cross section, the diameter of a circle having an equal area to that of the cross section is set to be the diameter φ of the support pin.

Figure 4:
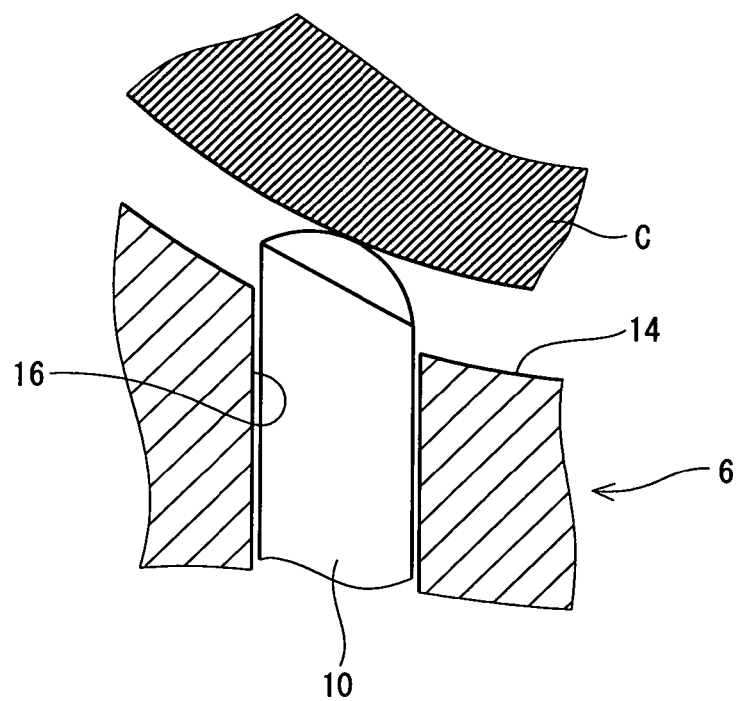
FIG. 4 is an enlarged sectional view showing a part of the mold in FIG. 1.
Figure 4:
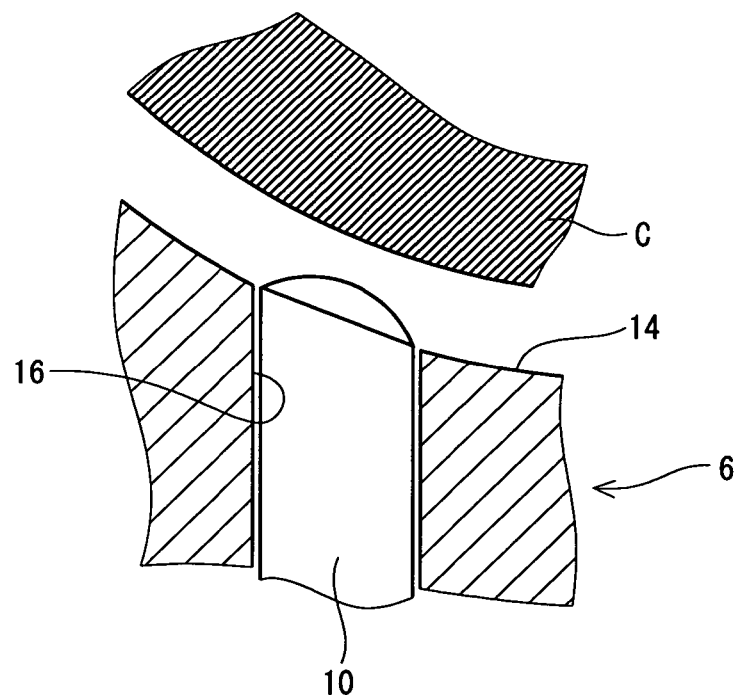

FIG. 4 is an enlarged sectional view showing a part of the mold 2 in FIG. 1. In order to manufacture a golf ball by an injection molding method using the mold 2, first of all, a core C is put in the cavity of the lower mold half 6. Next, mold clamping is carried out so that the support pin 10 is moved forward. FIG. 4(a) shows a state in which the support pin 10 is moved forward. By the forward movement, the support pin 10 holds the core C. The core C is positioned on the center of the spherical cavity. The air is present between the cavity surface 14 and the core C.

The mold 2 comprises a plurality of gates (not shown) on the parting line of the upper mold half 4 and the lower mold half 6. The spherical cavity is gradually filled with a molten resin composition which passes through the gates. Together with the filling, the air present between the cavity surface 14 and the core C is gradually discharged to the outside. The discharge is carried out through the clearance between the vent pin 8 and the vent pin hole 16, the slit S of the vent pin 8, the clearance between the support pin 10 and the support pin hole 18, and the slit S of the support pin 10. In the mold 2, the air is discharged from the slit S. Therefore, the air remains with difficulty. In particular, the slit S contributes to the discharge of the air just above the vent pin 8 and the support pin 10. In the golf ball obtained in the mold 2, various defects are caused by the remaining air with difficulty. The cavity may be decompressed through the silt S.

Immediately before the filling is completed, the support pin 10 is moved backward. FIG. 4(b) shows a state in which the support pin 10 is moved backward. Although the support pin 10 is provided apart from the core C, the resin composition (which is not shown in FIG. 4(b)) is present between the core C and the cavity surface 14. Therefore, the core C is rarely moved. After the filling is completed and the molten resin composition coagulates, the mold 2 is opened to take the golf ball out. The golf ball comprises a core and a cover formed by the resin composition.

The golf ball obtained by the mold 2 has a diameter of 40 mm to 45 mm. In respect of a reduction in an air resistance, the diameter is preferably equal to or smaller than 44 mm and is more preferably equal to or smaller than 42.80 mm. In respect of an adaptation to the standards of the United States Golf Association (USGA), it is preferable that the diameter should be equal to or grater than 42.67 mm. The golf ball obtained by the mold 2 has a weight of 44 g to 46 g. In respect of the acquirement of a sufficient inertia, it is preferable that the weight should be equal to or greater than 45.0 g. In respect of the adaptation to the standards of the USGA, it is preferable that the weight should be equal to or smaller than 45.93 g.

The mold 2 is particularly suitable for molding a cover having a small thickness. More specifically, the mold 2 is suitable for molding a cover having a thickness of 1.4 mm or less, furthermore, 1.2 mm or less and particularly 1.1 mm or less. The cover has a thickness of 0.2 mm or more, and particularly, 0.3 mm or more. The mold 2 is particularly suitable for molding a cover containing a polyurethane elastomer in 50% by weight or more, and particularly, 65% by weight or more.

In respect of the discharge of the air, the number of the slits S in the vent pin 8 is preferably equal to or larger than two, and is more preferably equal to or larger than three. In respect of the strength of the vent pin 8, the number of the slits S is preferably equal to or smaller than 20, and is more preferably equal to or smaller than 18.

The width of the slit S in the vent pin 8 is shown in an arrow W in FIG. 2(a). In respect of the discharge of the air, the width W is set to be equal to or greater than 1 μm. The width W is more preferably equal to or greater than 3 μm, and is particularly preferably equal to or greater than 5 μm. In respect of the suppression of the formation of a fin having a large size, the width W is set to be equal to or smaller than 30 μm, and particularly, to be equal to or smaller than 20 μm.

The depth of the slit S in the vent pin 8 is shown in an arrow D in FIG. 2(b). In respect of the discharge of the air, the depth D is preferably equal to or greater than 10% of the diameter φ, is more preferably equal to or greater than 15% of the diameter φ, and is particularly preferably equal to or greater than 20% of the diameter φ. More specifically, the depth D is preferably equal to or greater than 0.3 mm and is more preferably equal to or greater than 0.5 mm. In respect of the strength of the vent pin 8, the depth D is preferably equal to or smaller than 45% of the diameter φ, and is more preferably equal to or smaller than 42% of the diameter φ. More specifically, the depth D is preferably equal to or smaller than 3.8 mm, is more preferably equal to or smaller than 3.5 mm, and is particularly preferably equal to or smaller than 3.0 mm.

In respect of the discharge of the air, the number of the slits S in the support pin 10 is preferably equal to or greater than two and is more preferably equal to or greater than three. In respect of the strength of the support pin 10, the number of the slits S is preferably equal to or smaller than 20 and is more preferably equal to or smaller than 18.

The width of the slit S in the support pin 10 is shown in an arrow W in FIG. 3(a). In respect of the discharge of the air, the width W is set to be equal to or greater than 1 μm. The width W is more preferably equal to or greater than 3 μm, and is particularly preferably equal to or greater than 5 μm. In respect of the suppression of the formation of a fin having a large size, the width W is set to be equal to or smaller than 30 μm, and particularly, to be equal to or smaller than 20 μm.

The depth of the slit S in the support pin 10 is shown in an arrow D in FIG. 3(b). In respect of the discharge of the air, the depth D is preferably equal to or greater than 10% of the diameter φ, is more preferably equal to or greater than 15% of the diameter φ, and is particularly preferably equal to or greater than 20% of the diameter φ. More specifically, the depth D is preferably equal to or greater than 0.3 mm and is more preferably equal to or greater than 0.5 mm. In respect of the strength of the support pin 10, the depth D is preferably equal to or smaller than 45% of the diameter φ, and is more preferably equal to or smaller than 42% of the diameter φ. More specifically, the depth D is preferably equal to or smaller than 3.8 mm, is more preferably equal to or smaller than 3.5 mm, and is particularly preferably equal to or smaller than 3.0 mm.

The vent pin 8 having the slit S and a support pin having no slit S may be used for the mold 2. A vent pin having no slit S and the support pin 10 having the slit S may be used for the mold 2.

Figure 5:
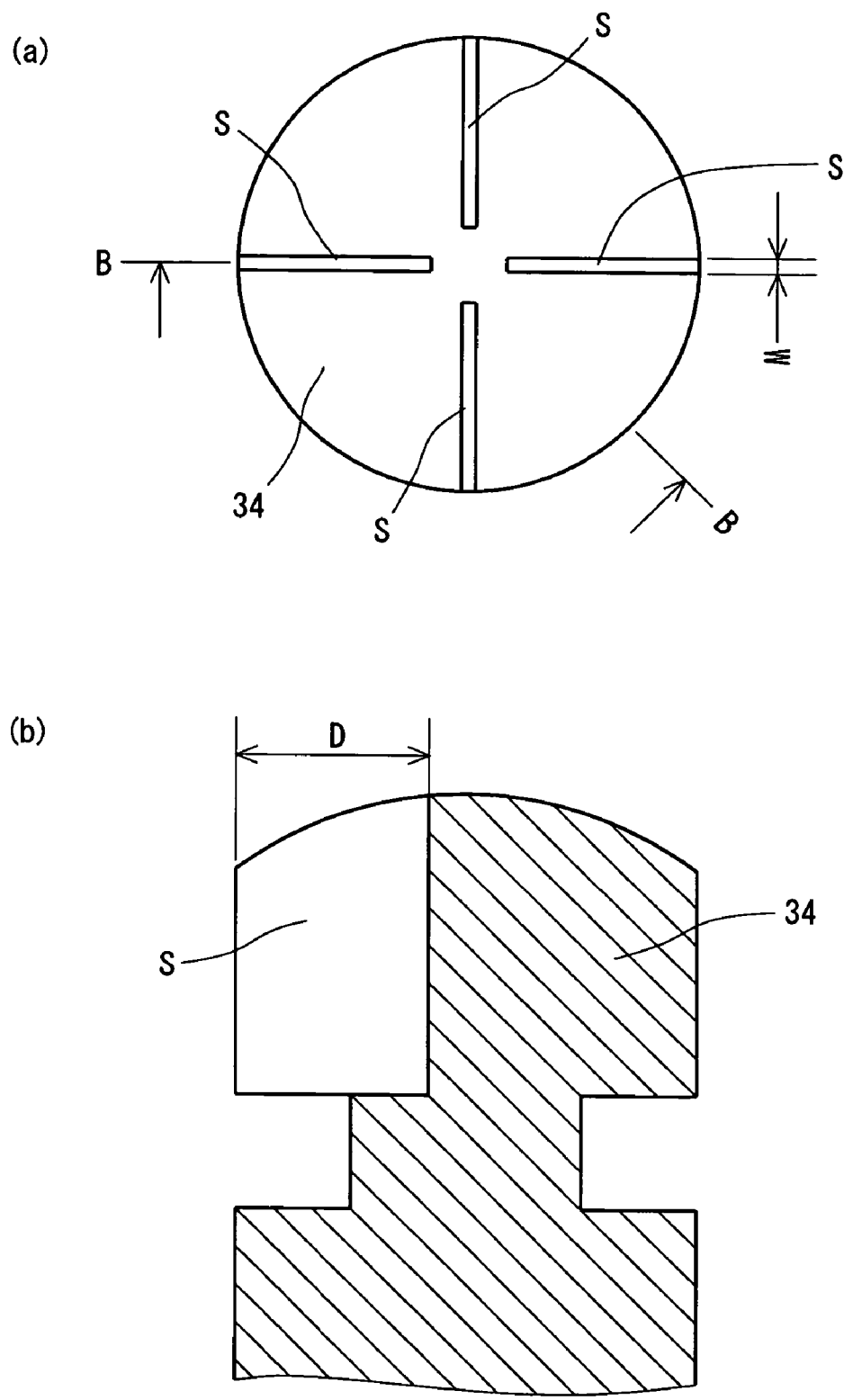
FIG. 5(a) is a plan view showing a vent pin in a mold according to another embodiment of the present invention.
FIG. 5(b) is a sectional view taken along a B-B line in FIG. 5(a)

FIG. 5(a) is a plan view showing a vent pin 34 in a mold according to another embodiment of the present invention, and FIG. 5(b) is a sectional view taken along a B-B line in FIG. 5(a). The vent pin 34 includes four slits S. In the vent pin 34, air in a cavity is discharged through the slit S. In respect of the discharge of the air, a width W of the slit S is set to be equal to or greater than 1 μm. The width W is more preferably equal to or greater than 3 μm and is particularly preferably equal to or greater than 5 μm. In respect of the suppression of the formation of a fin having a large size, the width W is set to be equal to or smaller than 30 μm and is particularly set to be equal to or smaller than 20 μm. In respect of the discharge of the air, a depth D is preferably equal to or greater than 0.3 mm and is more preferably equal to or greater than 0.5 mm. In respect of the strength of the vent pin 34, the depth D is preferably equal to or smaller than 3.8 mm, is more preferably equal to or smaller than 3.5 mm and is particularly preferably equal to or smaller than 3.0 mm. By using the vent pin 34, it is possible to reduce the defects of a golf ball.

FIG. 6(a) is a plan view showing a vent pin 36 in a mold according to a further embodiment of the present invention, and FIG. 6(b) is a sectional view taken along a B-B line in FIG. 6(a). The vent pin 36 includes four first slits S1 and four second slits S2. A depth D1 of the first slit S1 is greater than a depth D2 of the second slit S2. In the vent pin 36, air in a cavity is discharged through the first slit S1 and the second slit S2. In respect of the discharge of the air, a width W1 of the first slit S1 and a width W2 of the second slit S2 are set to be equal to or greater than 1 μm. The widths W1 and W2 are more preferably equal to or greater than 3 μm and are particularly preferably equal to or greater than 5 μm. In respect of the suppression of the formation of a fin having a large size, the widths W1 and W2 are set to be equal to or smaller than 30 μm and are particularly set to be equal to or smaller than 20 μm. In respect of the discharge of the air, the depth D1 of the first slit S1 and the depth D2 of the second slit S2 are preferably equal to or greater than 0.3 mm and are more preferably equal to or greater than 0.5 mm. In respect of the strength of the vent pin 36, the depths D1 and D2 are preferably equal to or smaller than 3.8 mm, are more preferably equal to or smaller than 3.5 mm and are particularly preferably equal to or smaller than 3.0 mm. By using the vent pin 36, it is possible to reduce the defects of a golf ball.

FIG. 7(a) is a plan view showing a vent pin 38 in a mold according to a further embodiment of the present invention, and FIG. 7(b) is a sectional view taken along a B-B line in FIG. 7(a). The vent pin 38 includes four first slits S1 and twelve second slits S2. A depth D1 of the first slit S1 is greater than a depth D2 of the second slit S2. In the vent pin 38, air in a cavity is discharged through the first slit S1 and the second slit S2. In respect of the discharge of the air, a width W1 of the first slit S1 and a width W2 of the second slit S2 are set to be equal to or greater than 1 μm. The widths W1 and W2 are more preferably equal to or greater than 3 μm and are particularly preferably equal to or greater than 5 μm. In respect of the suppression of the formation of a fin having a large size, the widths W1 and W2 are set to be equal to or smaller than 30 μm and are particularly set to be equal to or smaller than 20 μm. In respect of the discharge of the air, the depth D1 of the first slit S1 and the depth D2 of the second slit S2 are preferably equal to or greater than 0.3 mm and are more preferably equal to or greater than 0.5 mm. In respect of the strength of the vent pin 38, the depths D1 and D2 are preferably equal to or smaller than 3.8 mm, are more preferably equal to or smaller than 3.5 mm and are particularly preferably equal to or smaller than 3.0 mm. By using the vent pin 38, it is possible to reduce the defects of a golf ball.

FIG. 8(a) is a plan view showing a vent pin 40 in a mold according to a further embodiment of the present invention, and FIG. 8(b) is a sectional view taken along a B-B line in FIG. 8(a). The vent pin 40 includes six slits S. In the vent pin 40, air in a cavity is discharged through the slit S. In respect of the discharge of the air, a width W of the slit S is set to be equal to or greater than 1 μm. The width W is more preferably equal to or greater than 3 μm and is particularly preferably equal to or greater than 5 μm. In respect of the suppression of the formation of a fin having a large size, the width W is set to be equal to or smaller than 30 μm and is particularly set to be equal to or smaller than 20 μm. In respect of the discharge of the air, a depth D is preferably equal to or greater than 0.3 mm and is more preferably equal to or greater than 0.5 mm. In respect of the strength of the vent pin 40, the depth D is preferably equal to or smaller than 3.8 mm, is more preferably equal to or smaller than 3.5 mm and is particularly preferably equal to or smaller than 3.0 mm. A tip portion 42 of the vent pin 40 is flat. The tip portion 42 corresponds to the land of a golf ball. By using the vent pin 40, it is possible to reduce the defects of the golf ball.

Figure 9:
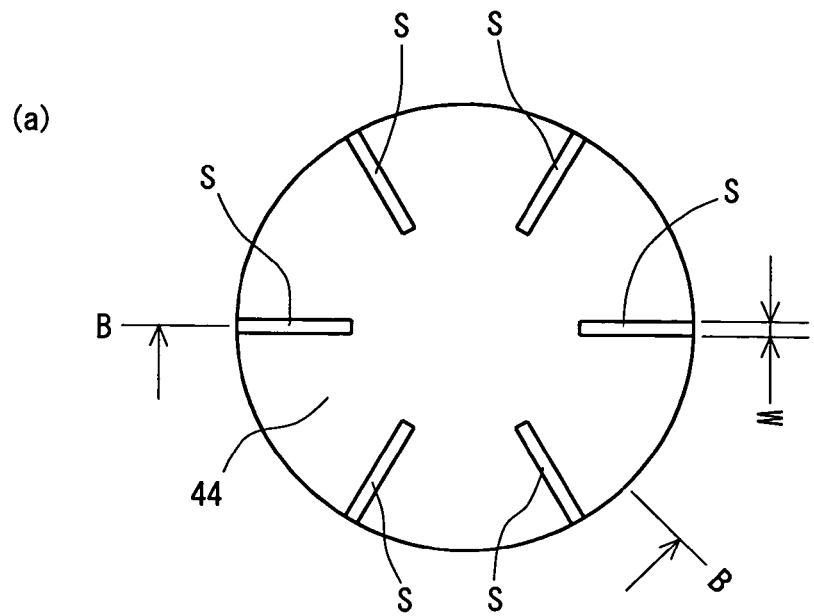
FIG. 9(a) is a plan view showing a support pin in a mold according to a further embodiment of the present invention.
FIG. 9(b) is a sectional view taken along a B-B line in FIG. 9(a).
Figure 9:
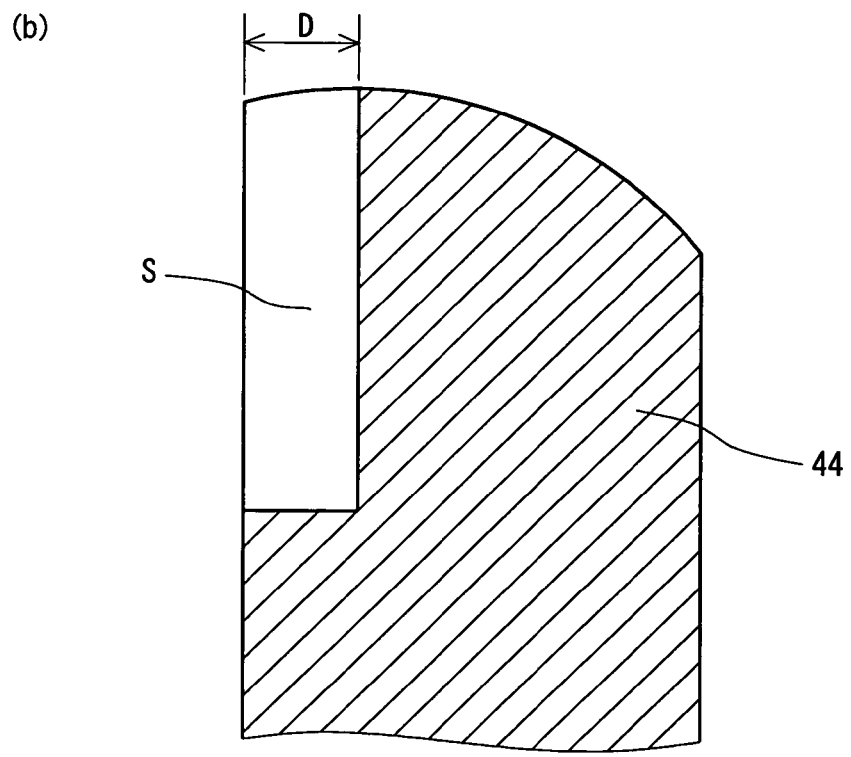

FIG. 9(a) is a plan view showing a support pin 44 in a mold according to a further embodiment of the present invention, and FIG. 9(b) is a sectional view taken along a B-B line in FIG. 9(a). The support pin 44 includes six slits S. In the support pin 44, air in a cavity is discharged through the slit S. In respect of the discharge of the air, a width W of the slit S is set to be equal to or greater than 1 μm. The width W is more preferably equal to or greater than 3 μm and is particularly preferably equal to or greater than 5 μm. In respect of the suppression of the formation of a fin having a large size, the width W is set to be equal to or smaller than 30 μm and is particularly set to be equal to or smaller than 20 μm. In respect of the discharge of the air, a depth D is preferably equal to or greater than 0.3 mm and is more preferably equal to or greater than 0.5 mm. In respect of the strength of the support pin 44, the depth D is preferably equal to or smaller than 3.8 mm, is more preferably equal to or smaller than 3.5 mm and is particularly preferably equal to or smaller than 3.0 mm. By using the support pin 44, it is possible to reduce the defects of a golf ball.

EXAMPLES

Example 1

100 parts by weight of polybutadiene (trade name of "BR01" manufactured by JSR Co., Ltd.), 29.5 parts by weight of zinc acrylate, 8 parts by weight of zinc oxide, a predetermined amount of barium sulfate, and 0.8 part by weight of dicumyl peroxide were kneaded so that a rubber composition was obtained. The rubber composition was put in a mold and was held for 23 minutes at a temperature of 160° C. so that a spherical core having a diameter of 41.1 mm was obtained. On the other hand, 70 parts by weight of a thermoplastic polyurethane elastomer (trade name of "Elastolan XNY90A" manufactured by BASF Polyurethane Elastomers Co., Ltd.), 30 parts by weight of a thermoplastic polyamide elastomer (trade name of "Pebax 5533" manufactured by Atifina Japan Co., Ltd.) and 3 parts by weight of titanium dioxide were kneaded so that a resin composition was obtained. Next, a core was put in a mold comprising a spherical cavity and the resin composition was injected around the core by an injection molding machine. Thus, a golf ball including a cover having a thickness of 0.8 mm was obtained. The details of a vent pin and a support pin in the mold are shown in the following Table 1.

Examples 2 to 7 and Comparative Examples 1 to 3

A golf ball was obtained in the same manner as in the example 1 except that a mold having a specification shown in each of the following Tables 1 and 2 was used.

[Visual Observation]

500 golf balls were observed visually to count the number of the golf balls in which air invades a cover and the number of the golf balls in which the scorching of the cover is generated. Furthermore, the size of a spew caused by a slit was evaluated. These results are shown in the following Tables 1 and 2.

TABLE 1

| | | Result of evaluation | | | | |
|---|---|---|---|---|---|---|
| | | Example 1 | Example 2 | Example 3 | Example 4 | Example 5 |
| Number of vent pins | | 1 × 2 | 1 × 2 | 1 × 2 | 1 × 2 | 1 × 2 |
| Number of support pins | | 6 × 2 | 6 × 2 | 6 × 2 | 6 × 2 | 3 × 2 |
| Vent pin | Pin diameter (mm) | 4.0 | 4.0 | 8.5 | 2.0 | 2.0 |
| | Shape of tip | 12R | 12R | 28R | Flat | Flat |

TABLE 1-continued

Result of evaluation

Figure 6:
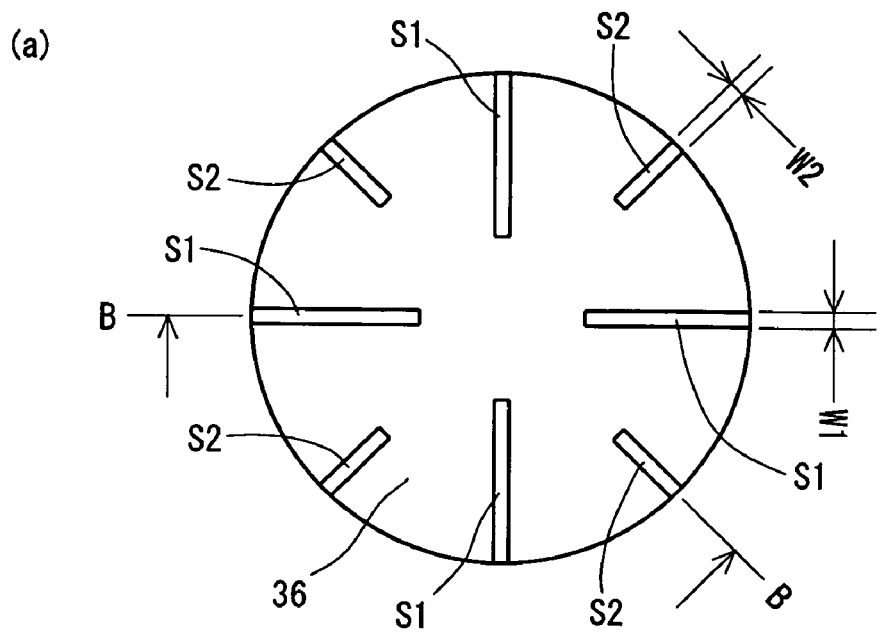
FIG. 6(a) is a plan view showing a vent pin in a mold according to yet another embodiment of the present invention.
FIG. 6(b) is a sectional view taken along a B-B line in FIG. 6(a)
Figure 6:
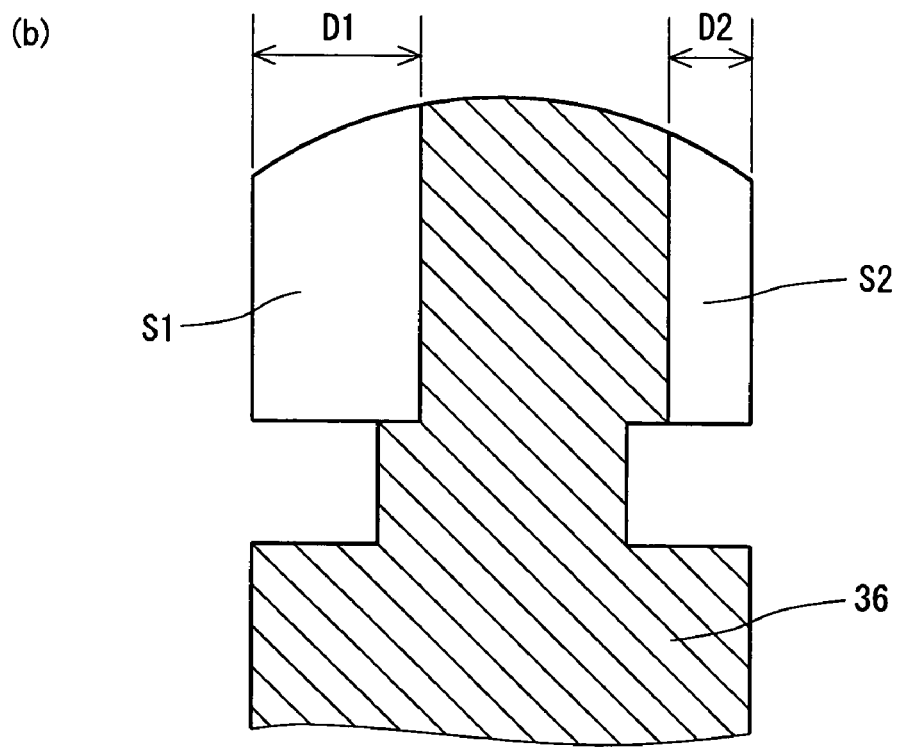
Figure 7:
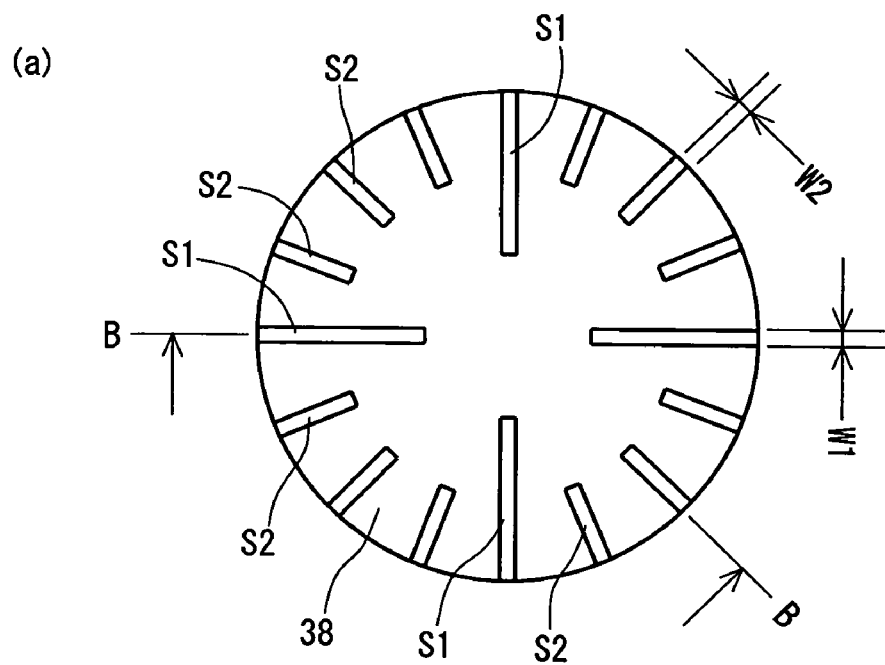
FIG. 7(a) is a plan view showing a vent pin in a mold according to a further embodiment of the present invention.
FIG. 7(b) is a sectional view taken along a B-B line in FIG. 7(a)
Figure 7:
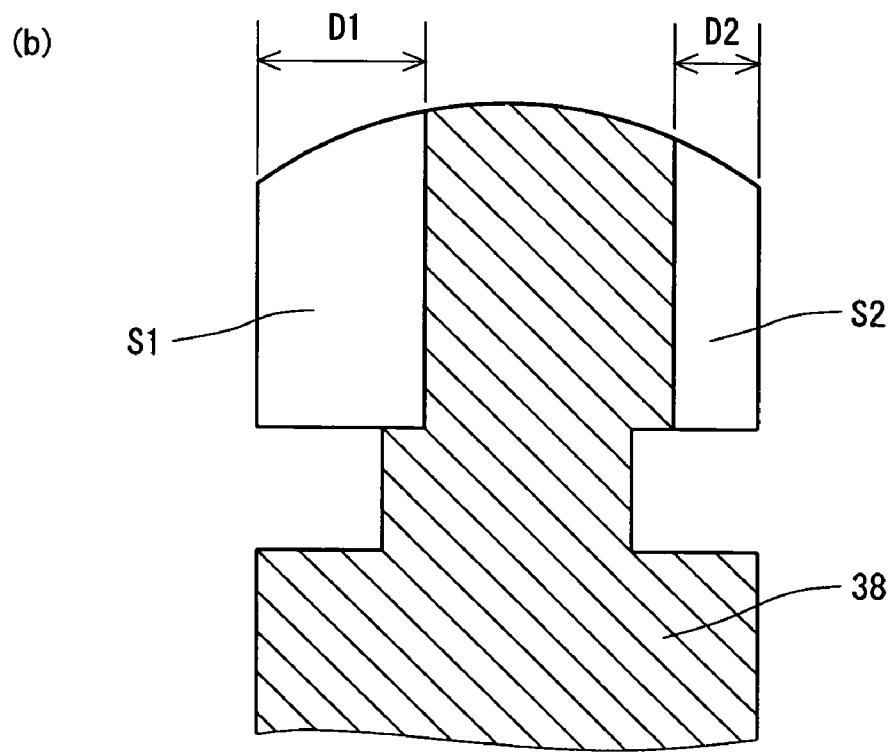
Figure 8:
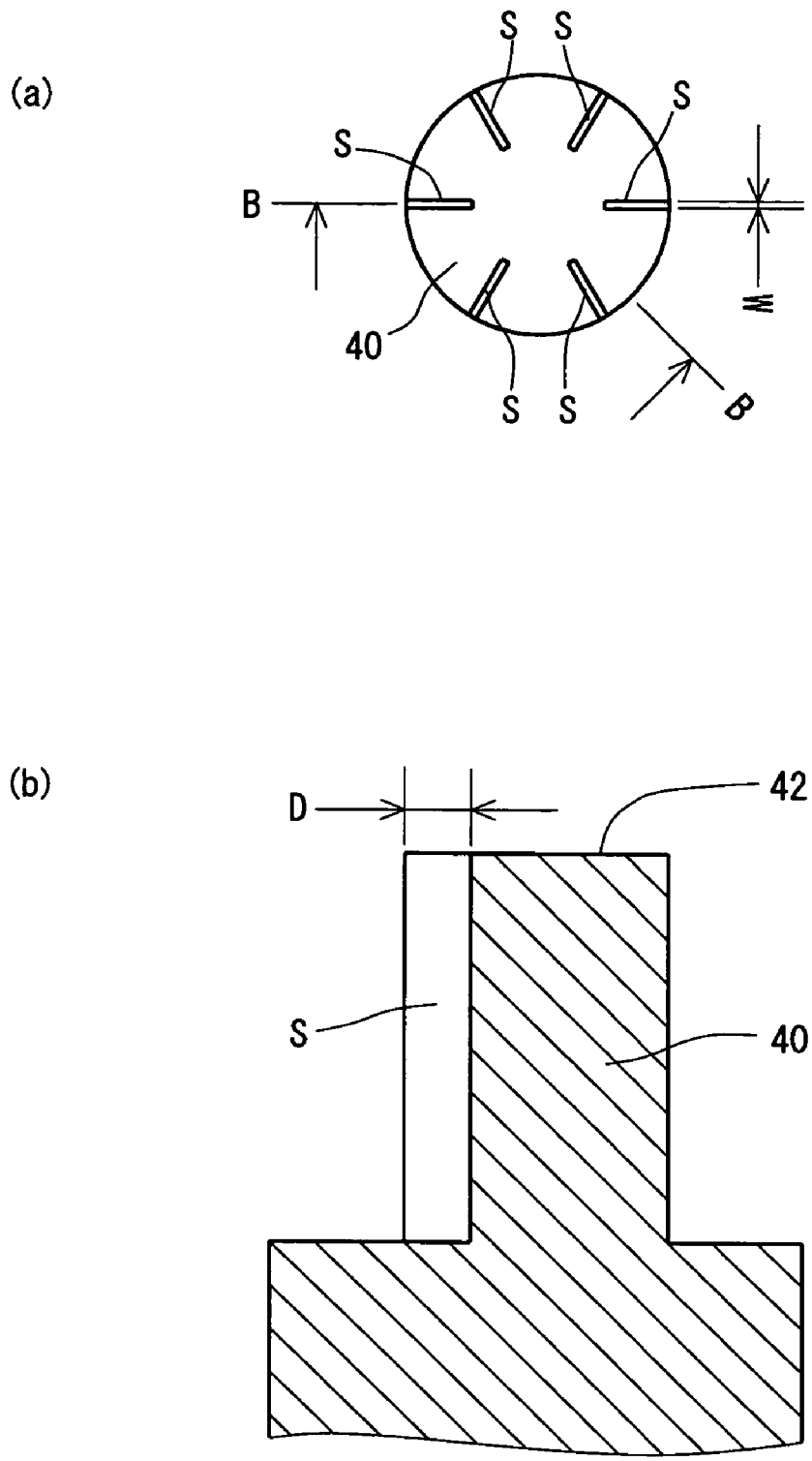
FIG. 8(a) is a plan view showing a vent pin in a mold according to a further embodiment of the present invention.
FIG. 8(b) is a sectional view taken along a B-B line in FIG. 8(a)

|  |  |  | Example 1 | Example 2 | Example 3 | Example 4 | Example 5 |
|---|---|---|---|---|---|---|---|
|  | Slit | Type | FIG. 2 | FIG. 6 | FIG. 7 | FIG. 8 | No slit |
|  |  | Number of first slits | 2 | 4 | 4 | 6 |  |
|  |  | Width of first slit (μm) | 20 | 15 | 25 | 20 |  |
|  |  | Depth of first slit (mm) | 1.8 | 1.5 | 3.8 | 0.5 |  |
|  |  | Number of second slits | — | 4 | 12 | — |  |
|  |  | Width of second slit (μm) | — | 10 | 15 | — |  |
|  |  | Depth of second slit (mm) | — | 0.5 | 2.0 | — |  |
| Support pin | Pin diameter (mm) |  | 3.0 | 3.0 | 3.0 | 3.0 | 3.0 |
|  | Shape of tip |  | 9R | 9R | 9R | 9R | 9R |
|  | Slit | Type | No slit | No slit | No slit | No slit | FIG. 3 |
|  |  | Number of slits |  |  |  |  | 4 |
|  |  | Width of slit (μm) |  |  |  |  | 20 |
|  |  | Depth of slit (mm) |  |  |  |  | 1.2 |
| Invasion of air |  |  | 0 | 0 | 0 | 0 | 0 |
| Scorching |  |  | 0 | 0 | 0 | 0 | 0 |
| Size of fin |  |  | Small | Small | Small | Small | Small |

TABLE 2

Result of evaluation

|  |  |  | Example 6 | Example 7 | Com. Example 1 | Com. Example 2 | Com. Example 3 |
|---|---|---|---|---|---|---|---|
| Number of vent pins |  |  | 1 × 2 | 1 × 2 | 1 × 2 | 1 × 2 | 1 × 2 |
| Number of support pins |  |  | 3 × 2 | 3 × 2 | 6 × 2 | 3 × 2 | 3 × 2 |
| Vent pin | Pin diameter (mm) |  | 2.0 | 3.0 | 4.0 | 2.0 | 2.0 |
|  | Shape of tip |  | Flat | 9R | 12R | Flat | Flat |
|  | Slit | Type | No slit | FIG. 5 | No slit | No slit | No slit |
|  |  | Number of first slits |  | 4 |  |  |  |
|  |  | Width of first slit (μm) |  | 10 |  |  |  |
|  |  | Depth of first slit (mm) |  | 1.2 |  |  |  |
|  |  | Number of second slits |  | — |  |  |  |
|  |  | Width of second slit (μm) |  | — |  |  |  |
|  |  | Depth of second slit (mm) |  | — |  |  |  |
| Support pin | Pin diameter (mm) |  | 4.2 | 3.0 | 3.0 | 4.2 | 4.2 |
|  | Shape of tip |  | 13R | 9R | 9R | 13R | 13R |
|  | Slit | Type | FIG. 9 | FIG. 3 | No slit | FIG. 9 | FIG. 9 |
|  |  | Number of slits | 6 | 4 |  | 6 | 6 |
|  |  | Width of slit (μm) | 10 | 20 |  | 40 | 0.5 |
|  |  | Depth of slit (mm) | 1.0 | 1.2 |  | 1.0 | 1.0 |
| Invasion of air |  |  | 0 | 0 | 238 | 0 | 212 |
| Scorching |  |  | 0 | 0 | 63 | 0 | 59 |
| Size of fin |  |  | Small | Small | None | Large | Small |

As shown in the Tables 1 and 2, the golf ball obtained from the mold according to each of the examples has a small number of defects, and furthermore, a small fin. From the result of the evaluation, the advantages of the present invention are apparent.

The mold according the present invention is also suitable for molding the inner and outer covers of a golf ball comprising a two-layered cover. The mold according to the present invention is also suitable for molding a cover formed by polymer compositions (typically, rubber compositions) other than a resin composition.

The above description is only illustrative and various changes can be made without departing from the scope of the present invention.

What is claimed is:

1. A golf ball manufacturing method comprising the steps of:
   preparing a mold comprising a support pin capable of being moved forward and backward with respect to a spherical cavity and a vent pin, the vent pin including a slit having an upper end opened toward the cavity and having a width of 1 μm to 30 μm, and a second slit having an upper end opened toward the cavity and having a width of 1 μm to 30 μm, a depth of the first slit is greater than a depth of the second slit;
   holding a core on a center of the cavity of the mold by means of the support pin; and
   filling a circumference of the core with a molten polymer composition while discharging air in the cavity through a slit of the support pin and the slits of the vent pin.

2. The method according to claim 1, wherein:
   the vent pin includes a plurality of first slits and a plurality of second slits; and
   the first slits and the second slits are alternately arranged about the vent pin.

3. The method according to claim 1 wherein:
   the vent pin includes a plurality of first slits arranged at regular intervals about the vent pin; and
   at least one second slit is positioned between two adjacent first slits.

4. A mold for a golf ball comprising a spherical cavity, a support pin capable of being moved forward and backward with respect to the cavity, and a vent pin, wherein the vent pin includes a first slit having an upper end opened toward the cavity and having a width of 1 μm to 30 μm, and a second slit having an upper end opened toward the cavity and having a width of 1 μm to 30 μm, a depth of the first slit is greater than a depth of the second slit, and a circumference of a core held on a center of the cavity by means of the support pin is filled with a molten polymer composition to form a cover constituted by the polymer composition.

5. The mold according to claim 4, wherein the first slit and the second slit have a depth of 0.3 mm to 3.8 mm.

6. The mold according to claim 4, wherein the cover has a thickness of 1.4 mm or less.

7. The mold according to claim 4, wherein:

the vent pin includes a plurality of first slits and a plurality of second slits; and the first slits and the second slits are alternately arranged about the vent pin.

8. The mold according to claim 4, wherein:

the vent pin includes a plurality of first slits arranged at regular intervals about the vent pin; and at least one second slit is positioned between two adjacent first slits.

* * * * *